United States Patent

[11] 3,613,542

| [72] | Inventors | Willi Wiessner<br>Wetzlar;<br>Georg Mann, Staufenberg, both of<br>Germany |
|---|---|---|
| [21] | Appl. No. | 50,805 |
| [22] | Filed | June 29, 1970 |
| [45] | Patented | Oct. 19, 1971 |
| [73] | Assignee | Ernst Leitz GmbH<br>Wetzlar, Germany |
| [32] | Priority | July 8, 1968 |
| [33] | | Germany |
| [31] | | P 19 34 466.2 |

[54] PHOTOGRAPHIC CAMERA HAVING ELECTRIC MOTOR DRIVE
8 Claims, 4 Drawing Figs.

| [52] | U.S. Cl. | 95/31 EL, 95/11 R |
| [51] | Int. Cl. | G03b 19/04, G03b 17/36 |
| [50] | Field of Search | 95/31 R, 31 EL, 11 R, 11.5 A |

[56] References Cited
UNITED STATES PATENTS

| 3,064,522 | 11/1962 | Fukuoka | 95/31 EL X |
| 3,135,182 | 6/1964 | Hintze et al. | 95/31 EL |
| 3,280,713 | 10/1966 | Goldberg | 95/31 EL |
| 3,404,614 | 10/1968 | Naumann | 95/31 EL |
| 3,448,670 | 6/1969 | Suzuki | 95/31 EL |
| 3,470,803 | 10/1969 | Fukuoka et al. | 95/31 EL |

Primary Examiner—Joseph F. Peters
Attorney—Krafft & Wells

ABSTRACT: A photographic camera is provided with an electric motor drive which—upon closing of the motor circuit—releases the camera shutter in a first phase of operation, is then brought to a standstill for the time of the shutter run, and is started at the end of the shutter run by the shutter itself into a second phase of operation wherein the motor drive completes the shutter-cocking and film-advancing action. An electric contact is arranged in the proximity of an element that is rotated once per shutter-cocking and film-advancing action and the element is provided with a wiper that closes the contact momentarily once during every rotation. An electric pulse is thus generated during every film-advancing action and is made available at the outside wall of the motor drive housing. The pulse may be put to different uses, for example, to release a second camera of similar type, the pulse of which is fed back for releasing the first camera so that both cameras release one another, or to operate an electromagnetic remote picture-counting device.

WILLI WIESSNER
GEORG MANN
INVENTORS

BY Krafft + Wells

PHOTOGRAPHIC CAMERA HAVING ELECTRIC MOTOR DRIVE

BACKGROUND OF THE INVENTION

The present invention relates to the photographic art. More particularly the invention relates to a camera which is equipped with an electric motor drive.

Electric motor drives for photographic cameras are already known in the art in different embodiments. There are motor drives known which are undetachably incorporated in a common housing together with the camera and there are others known which can be fastened to the camera housing for special occasions.

This distinction between the different motor drive forms is less important, however, compared to the one explained hereinafter. With regard to their technical mode of function there can be distinguished between a type of motor drive which is set off at the end of the manually released shutter operation by a camera element which is moved during the shutter run. The motor drive then performs only the transport of the film and the cocking of the shutter so that the camera is again automatically ready for a new exposure.

In another and more convenient to handle type the motor drive additionally performs the shutter release. With the first-mentioned type the camera shutter is released by manually pressing the shutter release button conventionally provided on the outside of the camera housing and the motor drive is started into action only after the film has already been exposed and the shutter is again closed. In the second type, for shutter release, a button is provided on the outside of the motor drive housing and has to be pressed whereby an electric contact is closed. This causes the motor to begin to run, and by means of gears and cams the motor drive itself releases the camera shutter during a first phase of its action. After the camera shutter has been released, the motor drive is stopped for the time of the shutter run and at the end of the shutter run is again energized so that it will complete the film transport and shutter cocking cycle. A motor drive of this type is, for example, described in the U.S. Pat. No. 3,404,614, issued on Oct. 8, 1968 to Paul Naumann of Alkmaar, North Holland and assigned to the assignee of the present invention.

It is, however, a drawback of such motor drives that the completion of one of such cycles, i.e. motor release, shutter release, shutter run and film transport plus shutter cocking takes a certain time so that, on the average, not more than three to four exposures can be made in one second. The exact number depends on the smoothness of the camera gearing, on the state of the film, i.e. whether it is an old and dry film or a relatively fresh and flexible one, on the voltage supply of the battery, whether it is new or already drained to some extent, and the like.

It has, however, proven that a sequence of three to four pictures in one second is very often not enough to catch and record really fast action events, mainly sports events.

It is, therefore, the object of the present invention to provide means for increasing the number of exposures that can be made with motor-driven cameras in a certain time unit.

SUMMARY OF THE INVENTION

The above stated object is attained by coupling two motor-driven cameras in such a way that the cameras take exposures alternately, one camera exposing its film during the film transport and shutter-cocking period of the other.

To this end, each motor drive is provided with an additional contact which is momentarily closed during the film transport and shutter-cocking period. Thereby an electric pulse is generated and this pulse is supplied to the other camera where it serves as the motor release pulse which starts the motor of the other camera into action. Actually, this pulse takes the place of the pulse otherwise generated by manually pressing the motor release button on the outside of the motor drive housing. The other camera is, of course, also provided with an additional contact of which the pulse is fed back to the first camera releasing the motor drive of this camera.

In this manner the motor drives of both cameras release each other alternately after the cycle has been started off by pressing the release button on one of the two motor drive housings. This cycle of camera operation would continue indefinitely, or at least to the end of the film supply unless particular means are provided for breaking the cycle and setting the cameras to rest. As such means is used a switch in the electric lines between the two motor drives of the cameras. The switch is specially designed and will be described in detail with reference to the preferred embodiment of the invention.

It will be readily understood that from two cameras coupled in the above manner for alternate release, double the number of pictures will be obtained than from one camera, i.e. instead of only three pictures per second there will be six pictures taken. And it is a particular advantage of the invention that the two cameras can definitely not record the same phase of action twice, since the nature of the interconnection guarantees that when one camera exposes its film the other camera is in the progress of film transport and shutter cocking and vice versa.

After two motor-driven cameras had been mounted together in the aforedescribed manner it was discovered by applicants, however, that the pulse generated by the additional contact may not only be used for releasing the motor drive of a second camera, but may be put to other uses also. For example, it may operate an electromagnetic picture-counting device which is combined with a special motor release button in a housing remote from the camera.

BRIEF DESCRIPTION OF THE DRAWINGS

The invention will be more fully comprehended from the following detailed description when taken in conjunction with the appending drawings, wherein.

The invention will be more fully comprehended from the following detailed description when taken in conjunction with the appending drawings, wherein.

DESCRIPTION OF THE PREFERRED EMBODIMENTS

Figure 1:
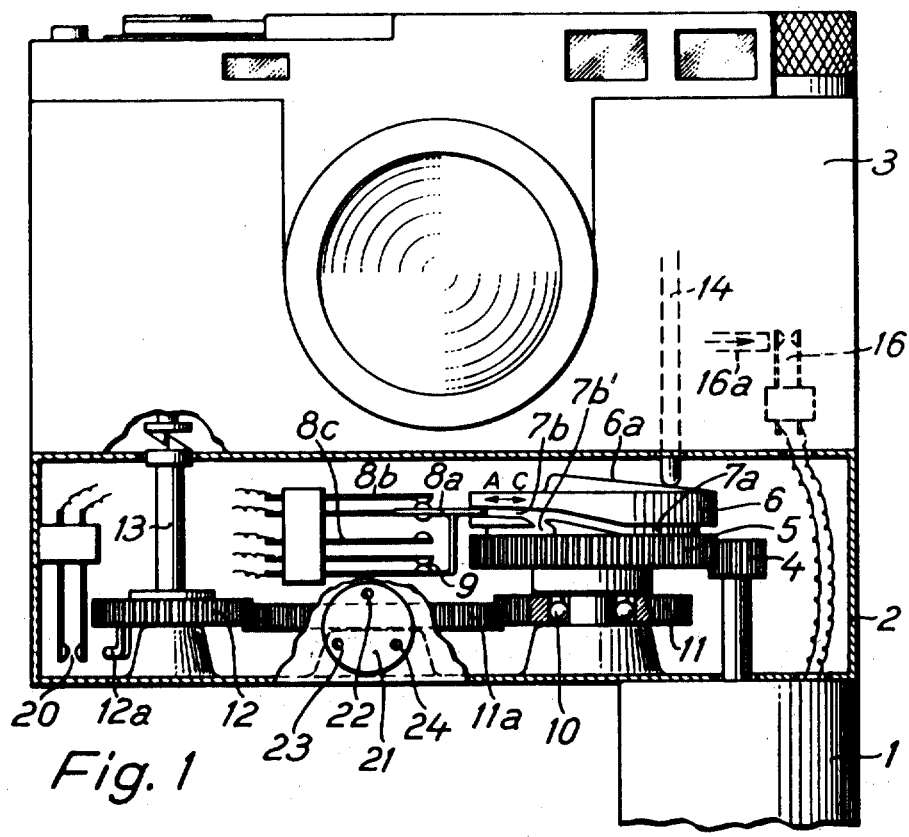
FIG. 1 is the front view of a camera with a motor drive attached thereto.

Referring now to FIG. 1 there is shown an electric motor 1 rigidly fastened to a gearbox 2. The motor drives a camera 3 by means of gears and cams contained in the gearbox. The illustration of the gear train in box 2 is only schematic because most of these elements as well as the operation of the motor drive as a whole have no direct bearing on the present invention.

Motor 1 carries on its shaft a pinion 4 which drives a spur gear 5. The drive takes place in alternating directions since the direction of rotation of the motor shaft is reversible by changing the poles of the motor. A cam disc 6 is fixedly mounted on the spur gear 5 in a coaxial arrangement. The circumference of the cam disc 6 is provided with a groove having a branch 7a without a rise, and a rising branch 7b. In the groove a middle switch blade 8a of a circuit-changing switch comprising the contact blades 8b and 8c is guided. A contact 9 is also connected to and operated by the middle switch blade 8a.

By means of a ratchet 10 which free wheels in the direction A the spur gear 5 is indirectly in mesh with another spur gear 11 which drives an intermediate gear 11a which, in turn, meshes with a cocking spur gear 12. A cocking shaft 13 is rigidly connected to the gear 12 and, upon rotation, the gear 12 causes the camera shutter to be cocked and the film to be advanced.

The cam disc is, further, provided with an axially extending cam 6a which acts upon a shutter release rod 14 and lifts it during rotation of the cam disc 6. In a manner not illustrated the shutter release rod 14 is in cooperation with the shutter release mechanism of the camera so that the shutter is released when the rod is lifted.

Figure 2:
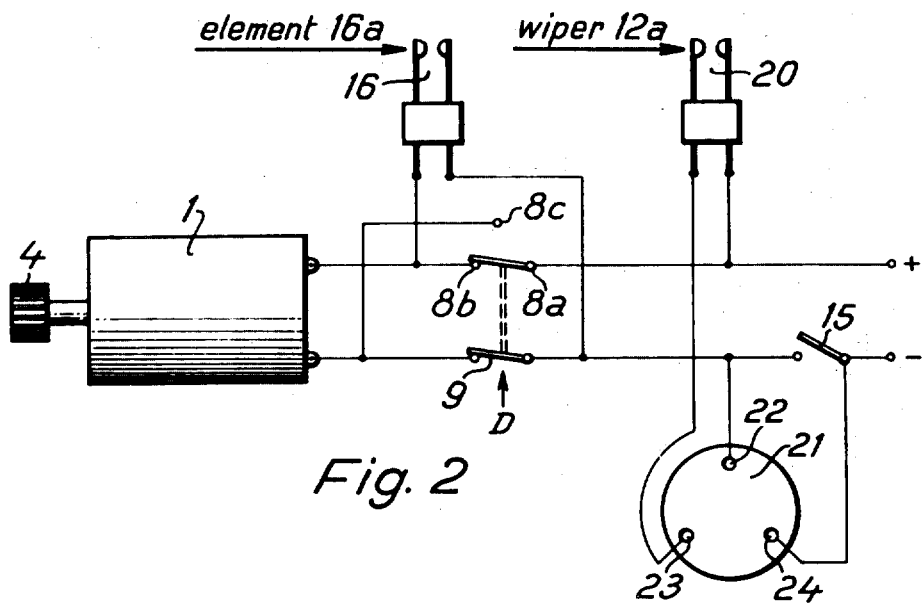
FIG. 2 shows schematically the wiring diagram of the electric motor in a first embodiment of the invention.

The electric circuitry of the motor 1 is shown in FIG. 2 together with the various switches and contacts. However, the illustration is also rather schematic in order to facilitate the understanding thereof. The motor operates in the following manner:

If the contact 15 is closed (FIG. 2) the motor is energized and begins to run, thereby rotating the spur gear 5 and the cam disc 6 in the direction of arrow A indicated in FIG. 1. This causes the rod 14 to be lifted by cam 6a and thereby—after the cam disc 6 has turned through a certain angle—the camera shutter is released. Simultaneously, the middle switch blade 8a is guided downwards by the groove branch 7b until it reaches point 7b' in the groove 7b (FIG. 1). This movement corresponds to a movement of the switch blades in the direction of arrow D as shown in FIG. 2. Thereby, the contact 8a, 8b is opened while the contact 8a, 8c is closed. Besides, the contact 9 is opened. As a consequence thereof, the motor 1 is deenergized and brought to a standstill. All dimensions of the gears, cams etc. are chosen so that the motor comes to a stop immediately after the camera shutter has been released. The latter is kept open for the preselected shutter time or exposure time and is thereafter closed. During the shutter run the motor 1 and the whole gear train is at rest, as has been pointed out before.

Further, the turning of the spur greater 5 in the direction of arrow A during this shutter release phase does in no way affect the gears 11, 11a and 12 since the ratchet 10 between the gear 5 and the gear 11 does not drive the gear 11 in this direction of rotation.

At the end of the shutter run an element 16a that moves during the shutter run hits upon a contact 16 (FIGS. 1 and 2), thereby again energizing motor 1. This time, however, the poles of the power supply have changed at the motor so that the latter begins to rotate in the direction opposite to the first direction of rotation. Spur gear 5 and the cam disc 6 are thus driven in the direction of the arrow C. During this rotation the middle switch blade 8a remains at the beginning in the lower groove branch 7a extending without rise along almost all of the circumference of the cam disc 6 so that the spur gear 5 and the cam disc 6 can rotate through almost one full revolution.

Throughout this revolution the gear 11 is driven by the ratchet 10 so that the cocking shaft 13 is also rotated which advances the film and cocks the shutter in the camera 3. Close to the end of the revolution of cam discs 6 the groove branch 7a rises to form the groove branch 7b, thereby opening the switch 8a and 8c and again closing the switch 8a and 8b. The contact 9 is simultaneously also closed.

Immediately prior thereto the contact 16 has been opened by the camera shutter and the contact 15 has been opened by the camera operator leaving the motor 1 without a current supply. The moment of inertia inherent in the gear train suffices, however, to carry the cam disc 6 back into its starting position, as shown in FIG. 1.

Particular emphasis is put on the fact that the various elements and their mode of operation and cooperation as described above is already well known in this particular art. It seems, therefore, justified to illustrate and describe them in a schematic manner only.

The object of the present invention, i.e. the increase of the number of exposures available per second by coupling together two different motor-driven cameras and, further, to provide means for actuating an electromagnetic picture counting device, is rather attained by providing an additional pulse-generating contact 20 in the motor drive. The contact 20 is shown in FIG. 1 to be arranged in the proximity of the cocking spur gear 12 and the latter is provided with a wiper 12a which wipes across the contact 20 once per revolution of the gear 12, i.e. once per film advance and shutter cocking. The contact 20 is thereby momentarily closed, generating a pulse in its lines. The electric connection of the contact 20 within the motor circuitry is shown in FIG. 2.

On the outside of the wall of gearbox 2 there is provided a terminal plate 21 (FIGS. 1 and 2) having three sockets 22, 23 and 24. Into the sockets may be plugged cables for the release by electric pulse of a second camera or for a remote camera shutter release together with a remote picture-counting device.

Figure 4:
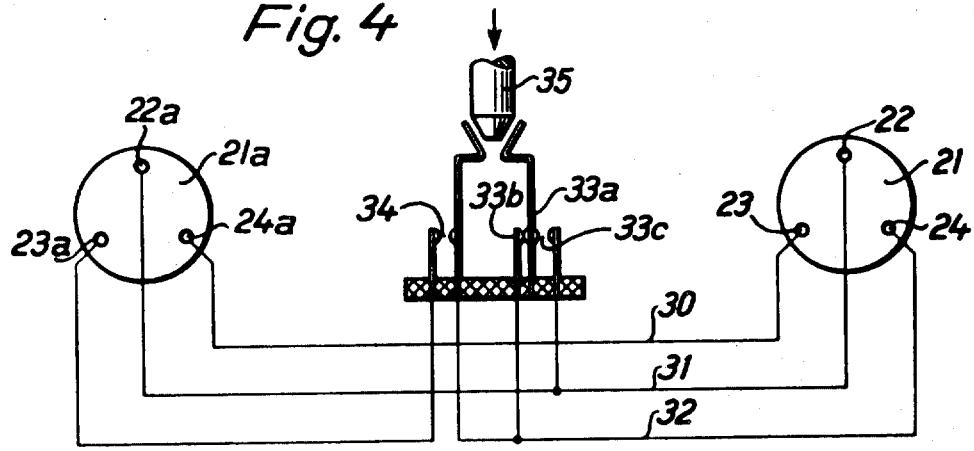
FIG. 4 shows the electric lines interconnecting two photographic cameras and a switch arranged in the lines.

The electric lines for the remote motor release are to be plugged into the sockets 22 and 24 (FIG. 4). The electric contact comprised in a known manner (and therefore not shown) in the remote motor release device at the other end of the line is then connected in parallel to the motor release contact 15 provided at the motor drive housing. Into the sockets 22 and 23 there may be plugged the lines of a remote picture-counting device. The lines of the motor release and the lines of the picture-counting device may, of course, be included in a common cable.

Figure 3:
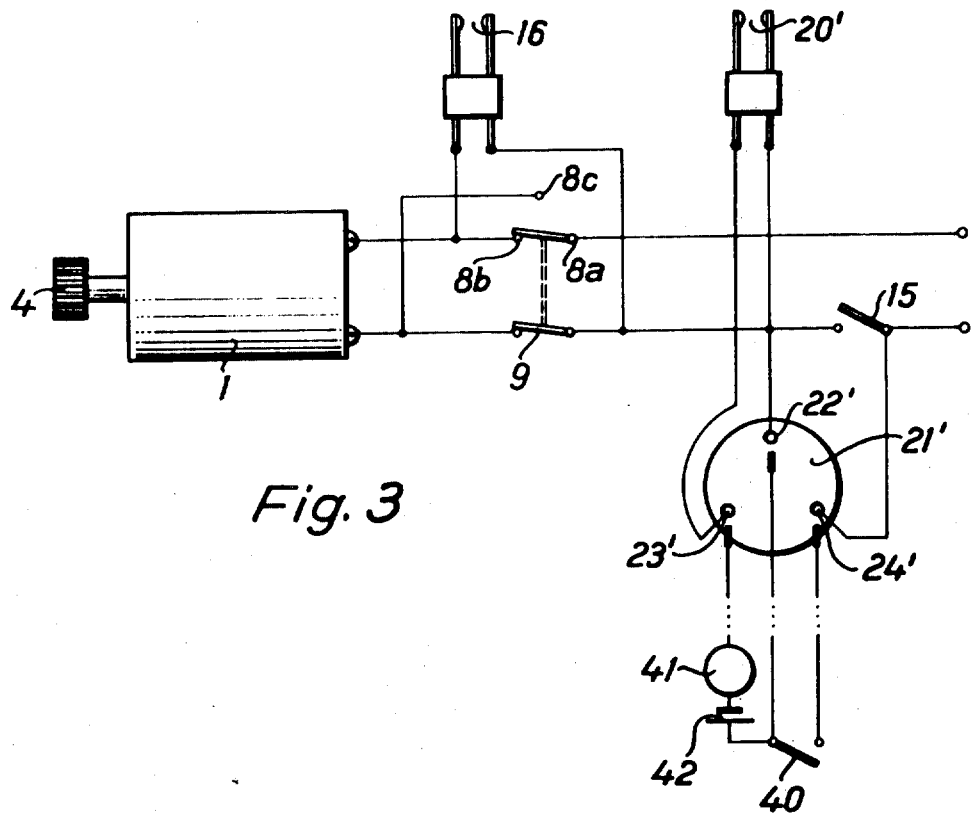
FIG. 3 shows schematically the wiring diagram of the electric motor in a second embodiment of the invention.

A slightly modified embodiment of the invention is illustrated in FIG. 3. The embodiment shown there differs from the embodiment of FIG. 2 in that the pulse-generating contact 20' is not electrically connected to the motor battery. Contact 20' is just a simple circuit breaker by means of which an outside circuit connected to the sockets 22' and 23' may be closed and opened in a pulselike manner. The outside circuit must, of course, have its own current source.

FIG. 3 shows a remote release device with a contact 40 and a picture counter 41 connected to the terminal plate 21'. Contact 40 is again in parallel to the motor release contact 15, as has already been described with reference to FIG. 2. Contrary thereto, the picture counter 41 is here provided with its own battery 42 which makes this counter independent from the motor circuit. The motor battery is, therefore, not discharged by the picture counter.

The main idea underlying the invention is, however, to use the additional pulse generating contact 20 for coupling together two cameras and to use the pulse obtained from each camera for the release of the other camera. A circuit which illustrates the manner in which this can be done is shown in FIG. 4. On the right-hand side of the figure there is shown the terminal plate 21 with the sockets 22, 23 and 24. On the left-hand side there is shown the terminal plate 21a of a second camera, having sockets 22a, 23a and 24a. The sockets of this second terminal plate 21a are within the second camera electrically connected in the same way to the motor circuit as are the sockets of the first-mentioned terminal plate 21 (FIG. 2).

From FIG. 3 it will be discernible that from the sockets 22 and 23—these are the pulse-delivering sockets—a wire connection 30, 31 exists to the remote release sockets 22a and 24a at the terminal plate 21a. By means of these wires 30, 31 the pulse-generating contact 20 is connected in parallel to the motor release contact of the second camera, i.e. the latter contact is bridged by contact 20.

On the other hand, it can readily be seen that the pulse-delivering sockets 22a and 23a of the second terminal plate 21a are in connection with the remote release sockets 22 and 24 by means of the wires 31 and 32. Thus, FIG. 3 shows clearly that the pulse-generating contact of one camera is electrically connected to the remote release sockets of the other camera, as a consequence whereof both cameras continue to release one another if this cycle is started off manually by closing and keeping closed the motor release contact 15 of both motor drives. For more convenience in operation a holding contact (not shown) may be connected in parallel to the motor release contacts 15, which holding contact is closed when contacts 15 are closed and which opens only at the end of the shutter-cocking phase, even if the contacts 15 are opened prior thereto. Provided such a holding contact is installed it will not be possible to break from the outside the cycle of the cameras releasing one another.

In order to start and stop the cameras at will a special switch is provided in the wires 31 and 32. The switch comprises a wiper contact 33 having an intermediate isolated switch blade 33a and two contact blades 33b and 33c, and a circuit breaker 34 which is normally open. The wiper contact 33 and the circuit breaker are operated simultaneously by pressing a key 35.

This causes the circuit breaker 34 to be closed with the intermediate switch blade 33a at the same time being moved to the right-hand side of FIG. 4. The contact blade 33b follows to a certain extent the intermediate blade 33a to the right so that for some moments both contacts 33b and 33a together bear against contact 33c. The motor release contact 15 in the motor drive is thereby bridged and the right-hand camera, to which the terminal plate 21 belongs, is released. When the key 35 is pressed further down the left-hand contact blade 33b stops to follow blade 33a so that the connection between the wires 31 and 32 is interrupted at this place. The circuit breaker 34 remains closed, however, so that the cameras continue to release one another. It has to be remembered, of course, that both motor release contacts 15 in the cameras are bridged by a holding contact.

When, later, key 35 is let free the circuit breaker 34 will be reopened so that the right-hand camera in FIG. 4 cannot be further released because its remote release line is interrupted. With a circuit as shown in FIG. 4 it is, therefore, always the left-hand camera which is the last one to be released at the end of a series of exposures.

A special effect in releasing the cameras may be achieved if the switch 33 and the circuit breaker 34 are not operated simultaneously by the key 35 but are operated one after the other, i.e. if switch 33 is closed first and circuit breaker 34 is closed afterwards. In this case both switches represent a multistage operation switch having two stages. In a first stage of depression of the key 35 only switch 33 is closed while circuit breaker 34 still remains open. Thus, the remote motor release line of the left-hand camera remains open and, consequently, this camera cannot be released by the pulse from the right-hand camera. Only when the key 35 is pressed down to the second stage the circuit breaker 34 is closed and the switch 33 is opened so that the cameras can release one another, as described above.

The arrangement including a multistage operation switch may be used, of course, for optionally releasing the right-hand camera alone for single exposures or both cameras for taking a sequence of snapshots. Further, if the multistage operation switch is arranged close to the motor release switch at the motor drive housing of the left-hand camera, so that both switches may be reached conveniently by the operator it will even be possible to release optionally either the left-hand camera for a single exposure by pressing the motor drive release switch at the housing of the left-hand camera or to release the right-hand camera for a single exposure by pressing the multistage operation switch into its first stage or to release both cameras for alternate exposures.

An arrangement like this will be of advantage if the two cameras are loaded with films of different types, for example with black-and-white film and with color film.

We claim:

1. Drive apparatus for photographic cameras for releasing the shutter, cocking the shutter and advancing the film, comprising:
   a. a reversible electric motor connected to a camera housing;
   b. an electric circuit for energizing said motor in a first direction to release said shutter and for energizing said motor in a second direction to cock said shutter and advance said film;
   c. gear means driven by said motor in said first direction of rotation;
   d. cam means connected to said gear means for actuating the shutter release mechanism of the camera after the gear means have rotated through a preestablished angle of rotation;
   e. first switch means in functional connection with the cam means for breaking said circuit at the end of said angle of rotation;
   f. second switch means actuated by the camera shutter at the end of the shutter run for closing said circuit with changed poles for energizing said motor in said second direction;
   g. a shutter-cocking and film advance shaft arranged in driving engagement with said gear means and said cam means having a gear train, said gear train including a ratchet which rotates said gear train only in said second direction;
   h. a wiper mechanically connected to an element of said gear train;
   i. an electric contact actuated by said wiper for generating an electric pulse per revolution of said gear train; and
   j. means for electrically connecting said electric contact to a terminal plate positioned on the outside of said camera housing.

2. The drive apparatus of claim 1, wherein said terminal plate has pulse-delivering sockets connected to said electric contact.

3. The drive apparatus of claim 1, wherein said terminal plate has remote release sockets connected to said electric circuit.

4. Drive apparatus for photographic cameras for releasing the shutter, cocking the shutter and advancing the film, comprising:
   A. first and second devices each having
      a. a reversible electric motor connected to a camera housing;
      b. a first electric circuit for energizing said motor in a first direction to release said shutter and for energizing said motor in a second direction to cock said shutter and advance said film;
      c. gear means driven by said motor in said first direction of rotation;
      d. cam means connected to said gear means for actuating the shutter release mechanism of the camera after the gear means have rotated through a preestablished angle of rotation;
      e. first switch means in functional connection with the cam means for breaking said circuit at the end of said angle of rotation;
      f. second switch means actuated by the camera shutter at the end of the shutter run for closing said circuit with changed poles for energizing said motor in said second direction;
      g. a shutter-cocking and film advance shaft arranged in driving engagement with said gear means and said cam means having a gear train, said gear train including a ratchet which rotates said gear train only in said second direction;
      h. a wiper mechanically connected to an element of said gear train;
      i. an electric contact actuated by said wiper for generating an electric pulse per revolution of said gear train;
      j. means for electrically connecting said electric contact to a terminal plate positioned on the outside of said camera housing;
      k. pulse-delivering sockets on said terminal plate connected to said electric contact; and
      l. remote release sockets on said terminal plate connected to said electric circuit;
   B. a second electric circuit connecting said pulse delivering sockets of said first device to said remote release sockets of said second device and said pulse-delivering sockets of said second device to said remote release sockets of said first device; and
   C. third switch means in said second circuit for actuating said first and second devices.

5. The drive apparatus of claim 4, wherein said cam means has a circumference with a cam groove therein, said cam groove including a horizontal groove, a raised portion and an undercut between the raised portion and the horizontal portion, and a camming surface on the top of said cam means.

6. The drive apparatus of claim 4, wherein said first switch means includes five resilient contacts in cooperative relationship with said cam means.

7. The drive apparatus of claim 4, wherein said second switch means has two resilient contacts in cooperative relationship with said shutter.

8. The drive apparatus of claim 4, wherein said third switch means has a key in cooperative relationship with a circuit breaker and a switch plate which in turn cooperates with two contact blades.